United States Patent [19]

Lund

[11] 3,737,083
[45] June 5, 1973

[54] BOAT CARRIER FOR USE ON RECREATIONAL VEHICLES

[75] Inventor: Kerry G. Lund, St. Paul, Minn.

[73] Assignee: Pic-A-Tent-Top Carrier, Inc., St. Paul, Minn.

[22] Filed: May 20, 1971

[21] Appl. No.: 145,159

[52] U.S. Cl.................224/42.1 H, 214/84, 214/450
[51] Int. Cl...............................................B60r 9/04
[58] Field of Search.....................224/42.1 R, 42.1 F, 224/42.1 H, 42.1 D, 42.1 G, 42.45 R, 42.45 A; 211/105.1; 248/251, 261, 267, 224, 225, 262, 264, 254; 214/450, 84

[56] References Cited

UNITED STATES PATENTS

| | | | |
|---|---|---|---|
| 2,469,945 | 5/1949 | Brei | 224/42.1 H |
| 2,859,887 | 11/1958 | Haight | 224/42.1 H |
| 1,824,385 | 9/1931 | Wintrob | 248/262 X |
| 3,615,069 | 10/1971 | Bott | 224/42.1 D |

Primary Examiner—Gerald M. Forlenza
Assistant Examiner—John Mannix
Attorney—Merchant & Gould

[57] ABSTRACT

A boat carrier for use on the top of tent trailers, campers, and the like having a rotatable and carrier or roller member to facilitate loading of the boat. The roller member is rotatably supported by two laterally spaced, vertical support members each of which removably engages a base plate screwed to the top of the cover. The roller member and vertical support members are readily removed from the cover top when the carrier is not in use.

5 Claims, 4 Drawing Figures

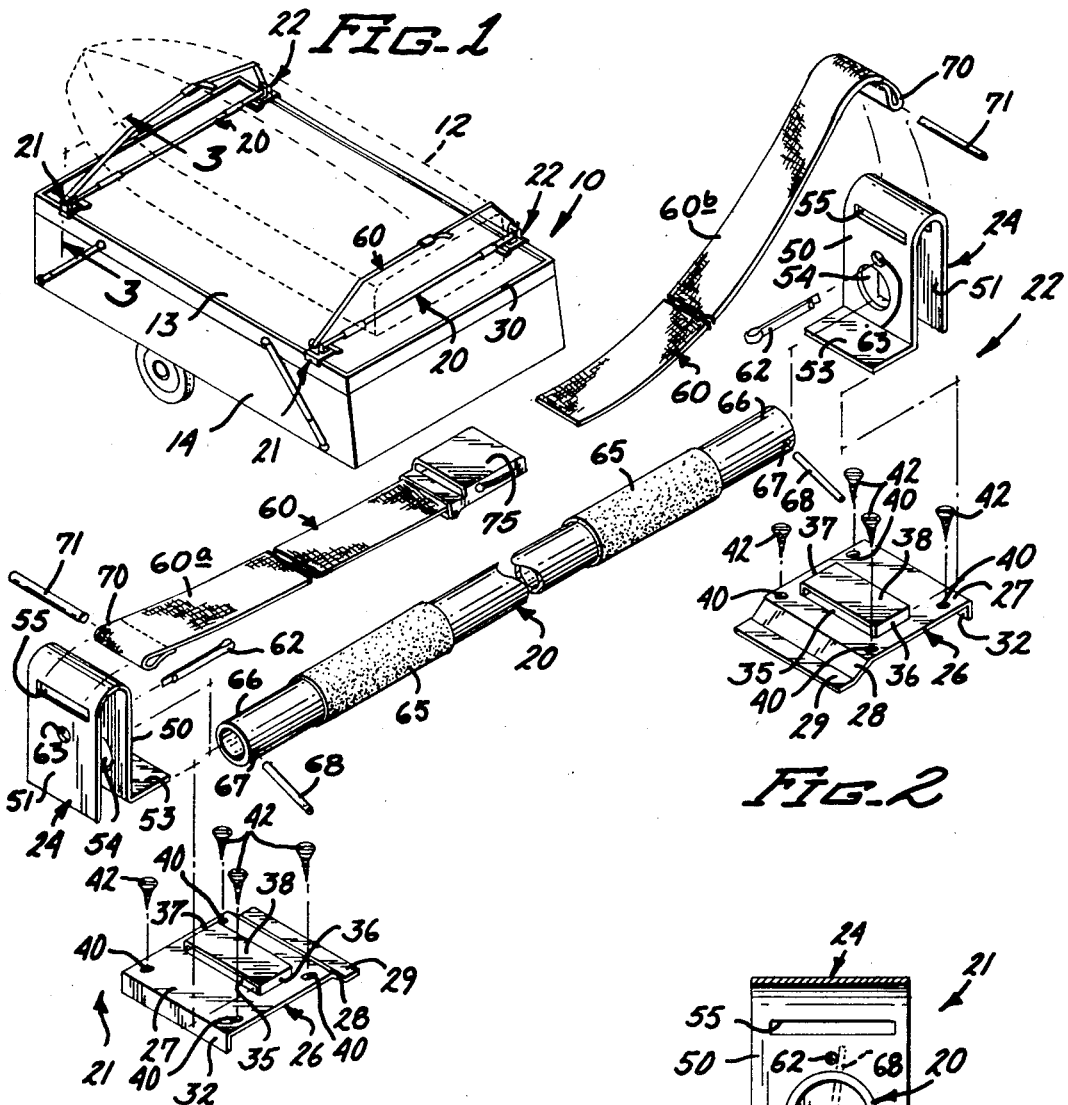
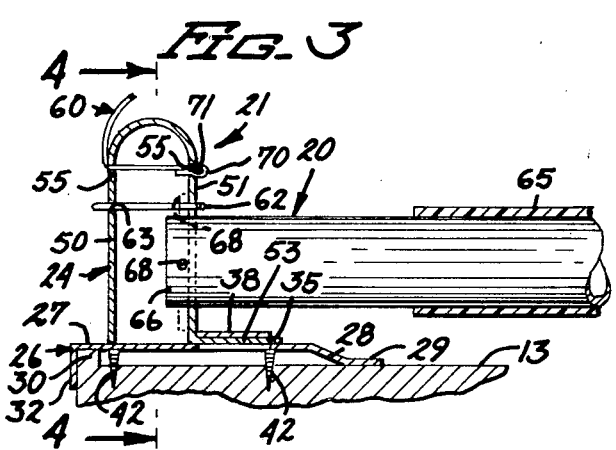

BOAT CARRIER FOR USE ON RECREATIONAL VEHICLES

BACKGROUND OF THE INVENTION

The present invention pertains to boat carrier apparatus for use on the top of recreational vehicle covers.

The utilization of camping trailers, campers for pick-ups, pick-up covers and the like is becoming increasingly popular. The increased popularity of such equipment has resulted primarily from (1) the greatly increased interest in camping as a recreational activity generally and (2) the numerous advantages this type of camping equipment offers over commercially available tents (e.g. elimination of the time-consuming need to "pitch" tents).

Typically, the presently available campers, camping trailers and the like are constructed from a durable, light weight metal (e.g. aluminum) which is of sufficient strength to support a considerable load placed on the top thereof. Thus, owners of this type of camping equipment frequently transport boats (or other large objects) on the top of the recreational vehicle cover. Presently, the boat is loaded either (1) directly onto the top of the vehicle cover or (2) it is carried by a roof-top carrier of any number of commercially available designs. Either of these two present approaches, however, has its disadvantages. For instance, mounting the boat directly onto the top of a pick-up camper frequently results in damage (e.g. loss of paint) to both the boat and the camper. Similarly, the use of the presently available roof-top carriers necessitates a considerable expenditure of time and energy in mounting and securing the carrier to the camper top (e.g. in positioning the carrier, strapping it down, etc.). An additional amount of time and energy is then spent in loading the boat onto the carrier. While it is known to provide a rotatable roller member for facilitating the loading of the boat onto a boat carrier (see, U.S. Pat. No. 2,469,987), the known rotatable carriers are for use on automobile roofs and do not readily lend themselves to use on recreational vehicle covers. For example, such carriers are commonly secured to the automobile by suction cups and, in most instances, straps which do not provide as secure a mounting on the vehicle as is desirable. This is particularly true when the vehicle will be traveling over rough roads such as is frequently the case for camping equipment. Thus, boat carrier apparatus which is particularly suited for use on the top of campers, camping trailers, etc. is commercially desirable.

SUMMARY OF THE INVENTION

The present invention provides load carrier apparatus for use on the top of recreational vehicle covers such as campers, trailer tents, and the like. The carrier apparatus includes a rotatable roller member which is supported by two transversely spaced support members. Each of the support members includes a generally vertically extending element having an outwardly directed flange along the bottom edge thereof and a generally horizontally extending base element which is preferably attached to the top surface of the vehicle cover by screw-like means. The base element has a slot-like opening for removably receiving the flange along the bottom edge of the vertical element to prevent vertical motion of the vertical support element. Additional means are associated with the vertical support element to prevent horizontal motion thereof and to retain this element within the slot-like opening. The roller member extends transversely between the vertical support elements and is rotatably supported thereby for rotation in response to the movement of a load (e.g. a boat) thereover.

In accordance with the present invention, the base element of each of the support members preferably remains secured to the vehicle cover after its initial installation. The screw-like means which is used to secure each base element to the vehicle cover provides secure and dependable attachment of the carrier. When the carrier is not in use, the roller member and the vertical support elements can be readily disconnected from the fixedly attached base elements. Thus, the present invention provides a rotatable carrier which is fixedly secured to the camper top or other similar recreational vehicle cover, but which, for the most part, can be readily removed when not in use. Additional advantages such as the simplicity of the present design will become apparent from a reading of the Detailed Description hereinbelow.

BRIEF DESCRIPTION OF THE DRAWINGS

FIG. 1 is a perspective view of the present load carrying apparatus shown mounted on the top of a tent trailer and having a boat carried thereby;

FIG. 2 is an exploded, fragmented view of the present boat carrier;

FIG. 3 is a cross-sectional view of the support member utilized in the present invention taken along the line 3—3 of FIG. 1; and FIG. 4 is a cross-sectional view taken along the line 4—4 of FIG. 3.

DETAILED DESCRIPTION OF THE PREFERRED EMBODIMENT

Turning now to a detailed description of the embodiment illustrated in the drawings, the numeral 10 generally designates the load carrier apparatus provided by the present invention. Carrier apparatus 10 is particularly well suited for transporting a boat 12, although it can be utilized to transport any number of other large objects (e.g. large pieces of lumber). As shown, boat carrier 10 (i.e. identical front and rear carriers 10) is mounted on a top 13 of a recreational vehicle cover 14. For purposes of this invention, the term "recreational vehicle cover" refers to pick-up covers, pick-up campers, camping trailers, and the like. In FIG. 1, the recreational vehicle cover 14 is illustrated as a camping trailer. While this type of vehicular equipment may have many uses outside of the recreational area, it is primarily intended for this purpose and hence will be referred to herein as "recreational" vehicular covers or equipment.

Boat carrier 10 includes a roller member 20 which is rotatably supported above trailer top 13 by two transversely spaced, support members 21 and 22. Each of the support members 21 and 22 includes a vertical support element 24 and a generally horizontally extending base element 26.

Base support element 26 includes a generally planar surface or base plate 27 which extends horizontally generally parallel to trailer top 13. An inclined inner edge 28 connected to a flange 29 raises the base plate 27 to a height generally equal to that of a raised molding 30 which extends about the edge of camper top 13. An outer edge 32 of base plate 27 extends vertically downward about the outer edge of molding 30. A horizontally extending, slot-like opening 35 is defined by a raised portion of the base plate 27. This raised portion is formed by two vertically extending side surfaces 36 and 37 and a horizontally extending upper surface 38 extending between the uppermost edges of side surfaces 36 and 37. As shown, the side surfaces 36 and 37 and the upper surface 38 are integrally formed with the base plate 27.

Base plate 27 further includes a plurality of openings 40 extending therethrough. A sheet metal screw 42 is insertable through each opening 40 and screwable into the trailer top 13 so as to fixedly secure base support 26 to top 13. Numerous alternative means such as bolts, various adhesives, etc. can also be utilized to fixedly secure the base support 26 to the camper top 13.

The vertical support element 24 is in the form of a generally inverted U-shaped member having a vertically extending inner surface 50 and a parallel, vertically extending outer surface 51. A horizontally extending flange 53 extends outward away from the bottom edge of the vertical inner surface 50. As will be subsequently described in greater detail, the flange 53 is suitable for insertion into the slot-like opening 35 of base support element 26. The vertical inner surface 50 also includes a circular opening 54 for journalling the roller member 20. A slot-like opening 55 is positioned in the inner surface 50 and the outer surface 51 for receiving therein an end of a load strap 60. A conventional cotter pin 62 is insertable through an opening 63 in the inner surface 50 and the outer surface 51 for the purpose subsequently described.

The roller member 20 is in the form of a tubular bar having two short plastic tubes or conduits 65 covering a portion thereof. The plastic tubes 65 are utilized to cushion the weight of the boat 12 as it moves over the roller member 20 preventing damage (e.g. paint chipping) to boat 12. The two oppositely disposed rod-like ends 66 of tubular roller member 20 are each journalled within one of the circular openings 54 in vertical supports 24 so as to be rotatably supported thereby. The ends 66 of roller member 20 each include an opening 67 extending transversely therethrough. A pin 68 having a length greater than the diameter of opening 54 is insertable in each of the openings 67. As shown, pin 68 is positioned transversely outward from the inner vertical surface 50 between inner and outer surfaces 50 and 51. Thus, pin 68 provides means for removeably retaining the journalled roller member 20 within opening 54. This also retains the flange 53 of vertical support element 24 within the slot-like opening 35 in base element 22 (i.e. prevents transversely outward movement thereof). It should be understood, however, that numerous alternative means can be provided for removeably attaching the vertical support element 24 to the base element 22 such as a pin (not shown) extending through flange 53 and base plate 27.

The load or boat strap 60 includes two strap halves 60a and 60b each having a looped end 70 which is insertable into the slot-like opening 54 in the inner and outer surfaces 50 and 51. A pin 71 is insertable through each of the looped ends 70 after their insertion into the respective openings 54 to secure the strap halves 60a and 60b to vertical support 24. A conventional adjustment buckle 75 is connected to the unsecured end of strap 60a and receives the unsecured end of strap 60b to provide adjustment of the overall length of strap 60.

The boat carrier 10 is preferably mounted on the trailer top 13 in the following manner. Two pairs of base support elements 26 are positioned in an oppositely disposed manner adjacent opposing side edges of trailer top 13, one pair near the front of trailer top 13 and the other pair near the rear of top 13 as shown in FIG. 1. Each base support 26 is then fixedly secured to trailer top 13 by screws 42 which are placed in openings 40 and screwed into top 13. The flange 53 of one of the vertical support elements 24 (e.g. the rear, leftmost support 24 in FIG. 2) is then inserted into the slot-like opening 35 in the respective base support 26 to mount support 24 in an upright position. An end 66 of roller member 20 is inserted into the opening 54 in the upright support 24 and the pin 68 is inserted into opening 67. The flange member 53 of another of the vertical supports 24 is then inserted into opening 35 of the oppositely disposed base support 26 (e.g. the rear, rightmost support 24) to position the support 24 in an upright position. As this flange member 53 is inserted into opening 35, the adjacent end 66 of roller member 20 is fitted into opening 54 so as to rotatably support member 20 therein. The pin 68 is then inserted into the opening 67 to secure the vertical support 24 thereto. As shown, the flange members are oppositely directed (i.e. they face one another). However, it should be understood that this orientation is not necessary where other means are utilized to removeably attach vertical support element 24 to base support element 22. When mounted in the manner shown, the slot-like opening 35 prevents vertical and longitudinal movement of the vertical supports 24 and the pins 67 through roller member 20 prevents transverse or laterally outward movement thereof. After similarly connecting the vertical supports 24 and roller member 20 to the forward base supports 26, the carrier 10 is ready to receive a boat.

To load boat 12 onto the boat carrier 10, the forward or bow portion of boat 12 is lifted vertically and placed onto the rear boat carrier 10. The boat is then pushed forward and upward until it rests on both the front and rear carriers 10 in the manner illustrated in FIG. 1. The rotation of the roller member 20 as boat 12 passes thereover greatly eases the loading of boat 12 onto trailer top 13. After positioning the boat as shown in FIG. 1, the pin 62 is inserted through opening 63. Pin 62 engages pin 71 to prevent undesired rotation of roller bar 20 after boat 12 is loaded thereon. The strap 60 is then placed over the boat and its length adjusted so as to fit snugly thereacross. Boat 12 can be removed from trailer top 13 by reversing this loading procedure.

To disassemble carrier 10, pin 68 is removed from one of the openings 67 to allow laterally outward movement of vertical support 24. This disengages the vertical support element from the slot-like openings 35 in base support element 26 and allows the oppositely disposed vertical support to be likewise removed from the respective slot-like opening. The disassembled vertical support elements 24 and roller member 20 can then be stored for future use. Since the base support elements 26 are generally unobtrusive, they can remain on the trailer top 13. As can be seen from this description, after base supports 26 are initially installed on trailer top 13, the carrier 10 can be readily assembled and disassembled with a minimum of time and effort.

What is claimed is:

1. Load carrier apparatus for use on recreational vehicle covers, comprising:
    a. first and second support members each having
        i. a generally vertically extending element having a flange along a bottom edge thereof, said flange being directed generally horizontally outward away from said bottom edge; and
        ii. a base element fixed attachable to the top surface of the recreational vehicle cover and including: an essentially horizontally extending base plate; a raised portion having transversely spaced side surfaces extending generally vertically upward from said base plate and a top surface extending transversely between said side surfaces to define a generally horizontally extending slot-like opening in said base element for removably receiving the flange of said vertically extending element; and a plurality of openings through said base element for receiving screw-like means engageable with the top of the recreational vehicle cover to fixedly attach said base element thereto;
    b. a roller member transversely extending between said vertical support elements and rotatably supported thereby for rotation in response to movement of a load thereover; and
    c. means for removably retaining said vertical support elements in said slot-like openings.

2. The load carrier apparatus of claim 1 wherein said first and second support members are oppositely disposed on the recreational vehicle cover having said flange portion of said first and second vertical support members insertable into said slot-like opening so as to be directed toward each other.

3. The load carrier apparatus of claim 2 wherein:
    a. said vertical element of each of said first and second support members includes a circular opening therethrough adjacent the uppermost edge thereof;
    b. said roller member includes two oppositely disposed rod-like ends journalled within said circular opening in each of said vertical elements; and
    c. the means for retaining said vertical support elements includes means removably attached to each of said rod-like ends transversely outward from said adjacent vertical support element.

4. The load carrier apparatus of claim 3 including means removably attached to at least one of said vertical elements and engageable with said roller member for preventing rotation thereof.

5. The load carrier apparatus of claim 3 wherein said transverse roller member is of sufficient length for supporting a boat thereon.

* * * * *